(12) United States Patent
Bischof et al.

(10) Patent No.: US 7,207,525 B2
(45) Date of Patent: Apr. 24, 2007

(54) APPARATUS FOR GRASPING OBJECTS IN SPACE

(75) Inventors: Bernd Bischof, Ganderkesee (DE); Juergen Starke, Bremen (DE); Hansjuergen Guenther, Bremen (DE); Peter Foth, Weyhe-Leeste (DE); Lothar Kerstein, Sottrum (DE)

(73) Assignee: EADS Space Transportation GmbH, Bremen (DE)

( * ) Notice: Subject to any disclaimer, the term of this patent is extended or adjusted under 35 U.S.C. 154(b) by 168 days.

(21) Appl. No.: 10/943,788

(22) Filed: Sep. 17, 2004

(65) Prior Publication Data

US 2005/0103940 A1    May 19, 2005

(30) Foreign Application Priority Data

Sep. 17, 2003    (DE)    ................. 103 42 953

(51) Int. Cl.
  *B64G 1/22*    (2006.01)
(52) U.S. Cl. ................. 244/172.6; 244/158.2
(58) Field of Classification Search ............ 244/172.4, 244/172.5, 172.6, 173.3, 158.1, 158.2
  See application file for complete search history.

(56) References Cited

U.S. PATENT DOCUMENTS

| | | | | |
|---|---|---|---|---|
| 1,317,500 | A | | 9/1919 | Holmquist |
| 3,465,986 | A | * | 9/1969 | Milly ..................... 244/172.4 |
| 3,526,372 | A | * | 9/1970 | Fentress .................... 244/1 R |
| 3,845,921 | A | * | 11/1974 | Thompson et al. ...... 244/172.6 |
| 4,083,520 | A | * | 4/1978 | Rupp et al. ................. 244/167 |
| 4,195,804 | A | * | 4/1980 | Hujsak et al. ........... 244/172.4 |
| 4,219,171 | A | | 8/1980 | Rudmann |
| 4,260,187 | A | * | 4/1981 | Frosch et al. .............. 294/86.4 |
| 4,273,305 | A | * | 6/1981 | Hinds ...................... 244/172.5 |
| 4,395,006 | A | * | 7/1983 | Taylor ..................... 244/172.4 |
| 4,588,150 | A | | 5/1986 | Bock et al. |
| 4,712,753 | A | * | 12/1987 | Howard ................... 244/172.4 |
| 4,718,709 | A | * | 1/1988 | Myers et al. ............... 294/106 |
| 4,750,692 | A | * | 6/1988 | Howard ................... 244/172.4 |
| 4,865,514 | A | * | 9/1989 | Tsuchihashi et al. ........ 414/736 |
| 4,890,918 | A | * | 1/1990 | Monford ..................... 356/150 |
| 4,929,009 | A | | 5/1990 | Vandersluis et al. |
| 4,929,011 | A | | 5/1990 | Vandersluis et al. |

(Continued)

FOREIGN PATENT DOCUMENTS

DE    3215229    1/1989

(Continued)

*Primary Examiner*—Timothy D. Collins
(74) *Attorney, Agent, or Firm*—W. F. Fasse; W. G. Fasse

(57) ABSTRACT

A remotely controlled apparatus for grasping an object such as a satellite in space includes a free-flying grasper unit connected by a selectively extendable cable to an orbital platform. The orbital platform and the grasper unit are preferably each independently propelled by respective propulsion systems including multi-axis maneuvering nozzles respectively provided on the orbital platform and on the grasper unit. The grasper unit preferably includes a grasper unit body and a grasper-arm mechanism having a controllable grasping claw articulately mounted on the end of a controllable telescoping arm that extends from the grasper unit body. The grasper unit preferably further includes a camera and a distance measuring sensor to provide visual and distance feedback data for assisting the remotely controlled maneuvering of the grasper unit and actuation of the grasper-arm mechanism.

18 Claims, 3 Drawing Sheets

U.S. PATENT DOCUMENTS

| | | | |
|---|---|---|---|
| 4,954,952 A * | 9/1990 | Ubhayakar et al. | 700/264 |
| 4,964,062 A * | 10/1990 | Ubhayakar et al. | 700/249 |
| 5,109,749 A | 5/1992 | Olcer | |
| 5,181,823 A * | 1/1993 | Hussey et al. | 414/730 |
| 5,299,764 A * | 4/1994 | Scott | 244/172.5 |
| 5,410,944 A * | 5/1995 | Cushman | 91/520 |
| 6,017,000 A | 1/2000 | Scott | |
| 6,354,540 B1 | 3/2002 | Lewis et al. | |
| 6,523,784 B2 | 2/2003 | Steinsiek et al. | |
| 6,655,637 B1 * | 12/2003 | Robinson | 244/172.4 |
| 2004/0031885 A1 * | 2/2004 | D'Ausilio et al. | 244/172 |
| 2004/0245407 A1 * | 12/2004 | D'Ausilio et al. | 244/172 |
| 2005/0151022 A1 * | 7/2005 | D'Ausilio et al. | 244/172 |

FOREIGN PATENT DOCUMENTS

| | | |
|---|---|---|
| DE | 3901882 | 4/1990 |
| DE | 19846327 | 3/2000 |
| EP | WO93/09054 | 5/1993 |

* cited by examiner

APPARATUS FOR GRASPING OBJECTS IN SPACE

PRIORITY CLAIM

This application is based on and claims the priority under 35 U.S.C. §119 of German Patent Application 103 42 953.0, filed on Sep. 17, 2003, the entire disclosure of which is incorporated herein by reference.

FIELD OF THE INVENTION

The invention relates to an apparatus for the remote-controlled grasping of objects in space, for example, for capturing and recovering satellites and other objects in orbit around the earth.

BACKGROUND INFORMATION

Various different systems and devices are known in the art for grasping or recovering satellites or other objects in space. Such systems typically comprise relatively complex robotic devices or mechanisms that operate from an orbital platform such as a utility or service satellite, a spacecraft, a space station, or the like. Such complex known systems are thus extremely expensive to design, build and operate, as well as difficult to operate and maintain. There is a need for a simplified, robust, and more-economical apparatus for grasping objects in space.

SUMMARY OF THE INVENTION

In view of the above, it is an object of the invention to provide a system or apparatus for grasping objects in space, that is simple, economical, and efficient for its intended purpose, as well as being flexibly adaptable to many different particular grasping applications. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in an apparatus for grasping a target object in space, comprising an orbital platform, at least one free-flying grasper unit, and a cable that connects or tethers the grasper unit to the orbital platform. The orbital platform may be a utility or service satellite, a spacecraft, a space station, or any other conventionally known orbital platform. The cable may be any cable, rope, strap, band, etc. that is made of any suitable material (e.g. stainless steel, other metal alloys, high-strength synthetic fiber materials, etc.) and has any suitable configuration (e.g. circular, polygon, flat ribbon, etc., in cross-section), and that is flexible so that it essentially transmits only tension forces and does not transmit significant compression or pushing forces along its length. The free-flying grasper unit includes a grasper-arm mechanism that is arranged on a grasper unit body and that is adapted to be controlled (and preferably remotely controlled) so as to controlledly grasp the target object. The free-flying grasper unit is preferably also independently propelled by its own propulsion system, so that it can be maneuvered under remote-control independently of the orbital platform within the range permitted by the length of the tethering cable.

With the above mentioned arrangement, the inventive apparatus is relatively simple and economical, yet highly adaptable for carrying out its grasping function with respect to many different, or essentially any, target objects having different configurations. Moreover, the inventive apparatus is able to grasp and securely hold the target object as long as necessary for the intended mission, and can then again release the target object after completion of the mission. Thereby, the inventive apparatus can be reused repeatedly for successive missions for grasping different target objects.

Also, the inventive apparatus has a relatively "gentle" grasping operation of its grasper-arm mechanism, preferably including a three-fingered grasping claw articulately mounted by a flexible or journalled coupling to a fixed arm or to a telescoping arm. The free-flying grasper unit has a low mass relative to the orbital platform, and is also freely independently "flyable" and maneuverable relative to the orbital platform, so that it can readily match its speed and motion to that of the target object while approaching and then grasping the target object.

Due to this "gentle" approaching and grasping ability, the inventive apparatus can also handle target objects that are sensitive or fragile, and are still active or intended to be re-activated after the grasping. Thus, it is important that the inventive apparatus does not cause any damage to the target object through the grasping operation. For example, using the inventive apparatus, a satellite that is not located on its proper nominal orbit path can be gently grasped, towed or otherwise moved by the orbital platform and/or the free-flying grasper unit by means of suitable thrusters provided thereon, and then released at a new location by the inventive apparatus, without having caused any damage to the satellite. For example the satellite, or any other target object, can be grasped at any sufficiently sturdy structural element or a purposely provided grasping lug or eyelet of the satellite, which is grasped by the grasping claw of the inventive apparatus.

The apparatus according to the invention, and especially the free-flying grasper unit, is remotely controllable via the orbital platform, or further through the orbital platform from a ground station on earth, or a control station in a spacecraft, space station, or the like. Remote control signals and control feedback data are transmitted between the orbital platform and the grasper unit via electrical conductor lines incorporated in the tethering cable. The remote-control involves a deployment and control of the telescoping arm, the grasping claw, as well as flight and maneuvering thrusters of the free-flying grasper unit. Through this control, if an initial grasping attempt is unsuccessful, it can be repeated without problems until a successful secure grasping has been achieved.

The inventive apparatus may include a plurality, e.g. two or three, of the free-flying grasper units that are each respectively connected to the orbital platform by a respective cable, and respectively outfitted with a grasper-arm mechanism. Depending on the particular type, nature or condition of the target object, thus, two grasper units can be deployed in succession or in parallel with one another in order to achieve a very secure and stable grasping configuration for holding the target object. Thereby, for example, tumbling or wobbling motions of the target object can be reduced or avoided.

BRIEF DESCRIPTION OF THE DRAWINGS

In order that the invention may be clearly understood, it will now be described in connection with an example embodiment thereof, with reference to the accompanying drawings, wherein.

DETAILED DESCRIPTION OF A PREFERRED EXAMPLE EMBODIMENT AND OF THE BEST MODE OF THE INVENTION

Figure 3:
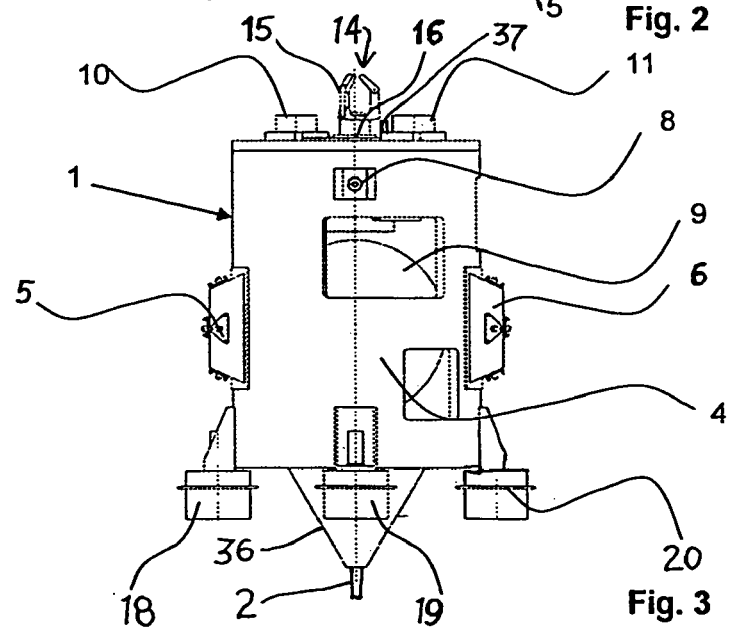
FIG. 3 is a schematic right side elevation view of the grasper unit of FIG. 1.
Figure 4:
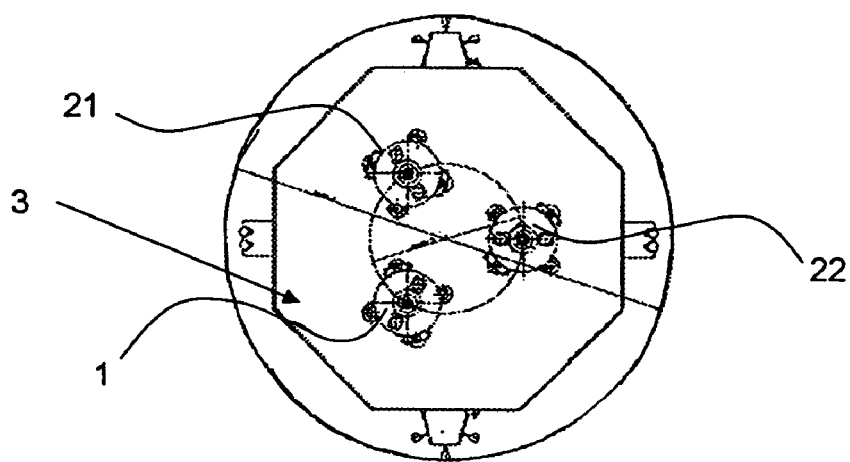
FIG. 4 is a schematic top plan view of an apparatus according to the invention including three free-flying grasper units connected to a larger orbital platform.
Figure 5:
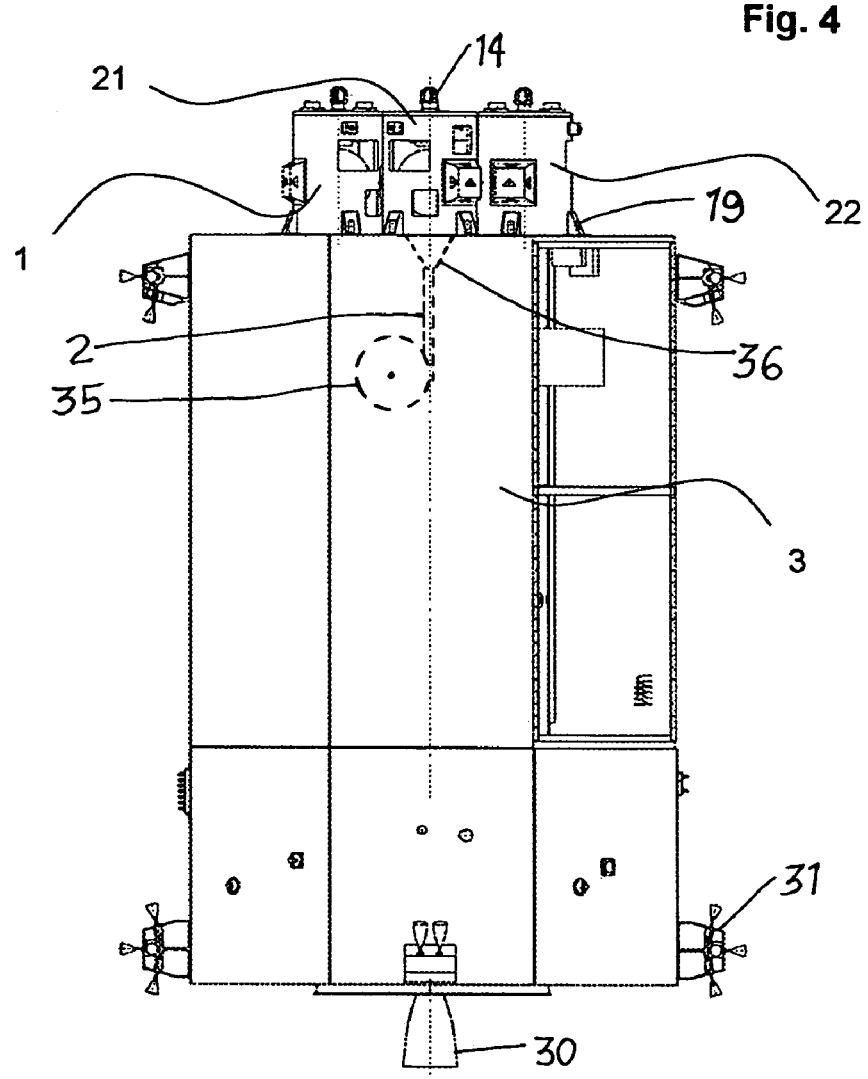
FIG. 5 is a schematic elevation view of the inventive apparatus according to FIG. 4.
Figure 6:
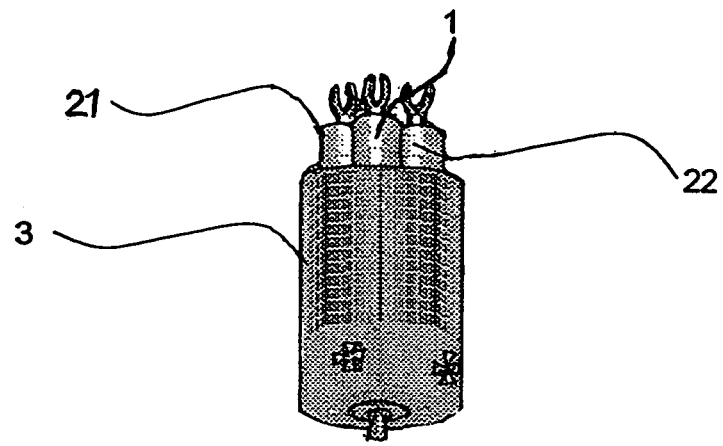
FIG. 6 is a representative perspective view of the apparatus according to FIG. 5 as orbiting in space.
Figure 7:
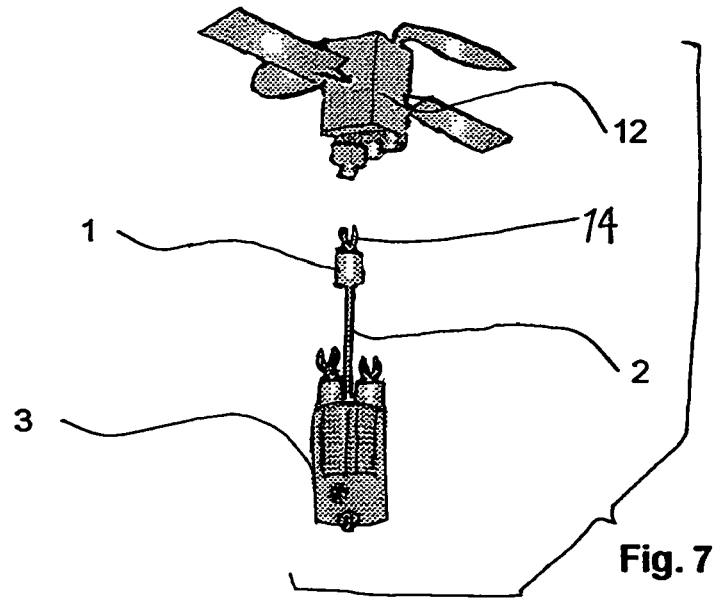
FIG. 7 is a schematic perspective view of the apparatus of FIG. 6 being deployed to grasp a satellite as a target object.
Figure 8:
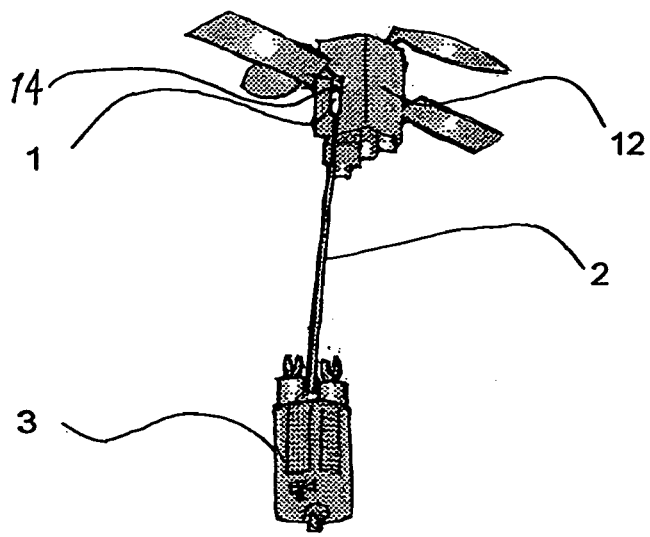
FIG. 8 is a view similar to FIG. 7, but showing a further stage in the deployment of the inventive apparatus, wherein one free-flying grasper unit has successfully grasped the satellite.

The inventive apparatus for grasping a target object is shown in FIGS. 4 and 5, and is shown deployed in a grasping operation in FIGS. 6 to 8. Furthermore, detailed features of one free-flying grasper unit included in the overall inventive apparatus are shown in the detail views of FIGS. 1 to 3.

Generally referring to FIGS. 4 and 5, the inventive apparatus includes at least one, and preferably in this embodiment three, free-flying grasper units 1, 21 and 22 mounted on one axial end of an orbital platform 3 such as a utility or service satellite, or the like. The orbital platform 3 has its own propulsion unit 30 as well as maneuvering thrusters 31. The orbital platform 3 also includes all necessary conventionally known onboard systems for flying, maneuvering, and controlling the orbital platform 3, for producing electrical power, as well as for control and data communication to a ground station on earth, or a control station on a space station or the like, for example via a radio link. As evident from the relative dimensions or proportions seen in FIGS. 4 and 5, each free-flying grasper unit 1, 21, 22 is substantially smaller and less-massive than the orbital platform 3.

The free-flying grasper units 1, 21, 22 are releasably secured and mounted on the orbital platform 3 respectively by launch and separation mounting adapters 17, 18, 19 and 20 (see FIGS. 1 to 3), as well as a permanently connected, but selectively extendable cable 2 (see FIGS. 1, 3, 7 and 8). The cable 2 comprises a mechanical tension-transmitting connecting cable element as well as insulated electrical conductor lines for providing an electrical power supply and data communication between the orbital platform 3 and the respective free-flying grasper unit 1, 21, 22. In this regard, the respective cable 2 is secured to and extends from the respective grasper unit 1, 21, 22 and extends retractably into the orbital platform 3, where it is selectively wound-up or unwound and extended from a respective cable winch 35 as schematically indicated in FIG. 5.

Also, each free-flying grasper unit 1, 21, 22 includes a docking and mounting cone 36 at a bottom end thereof, which is matingly received in a corresponding conical recessed docking and mounting receptacle of the orbital platform 3, for guiding and capturing the respective grasper unit 1, 21, 22 into its proper mounting position on the orbital platform 3 as the cable 22 is retracted to the fully-retracted position by the winch 35. Then the mounting adapters 17 to 20 are engaged for holding the respective grasper unit on the orbital platform.

Figure 1:
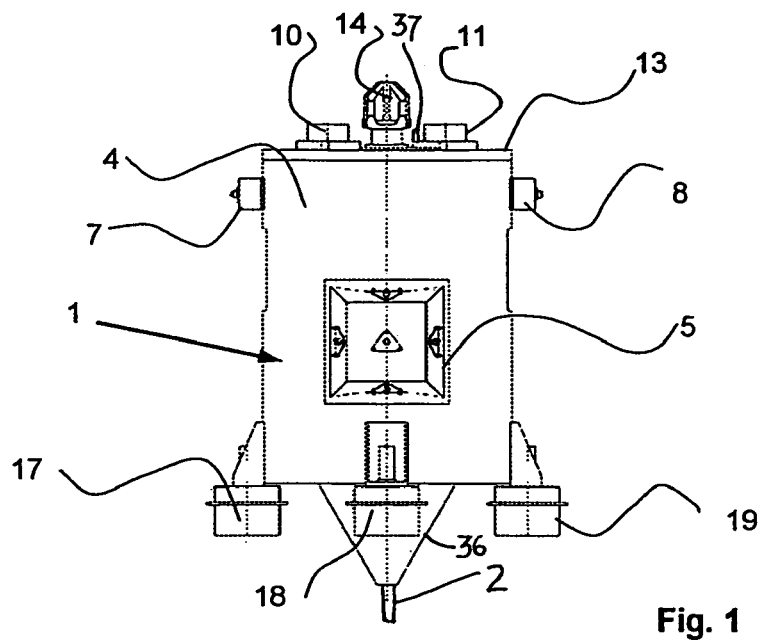
FIG. 1 is a schematic front elevation view of a free-flying grasper unit according to the invention.
Figure 2:
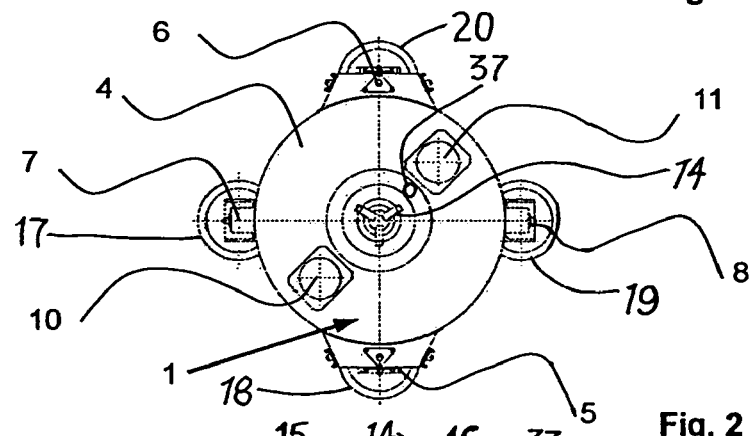
FIG. 2 is a schematic top plan view of the grasper unit of FIG. 1.

Further details of the structure of each of the grasper units 1, 21 and 22 will now be described in connection with a representative grasper unit 1 as shown in FIGS. 1 to 3. The free-flying grasper unit 1 comprises a housing 4 generally surrounding various internal components thereof and forming a structural grasper unit body. For example, the housing 4 surrounds or encloses a propellant tank 9 of a cold gas propulsion system. The tank 9, in this example embodiment, has a volume capacity to contain approximately 5 kg of nitrogen as a cold gas propellent or propulsion medium. The cold gas propulsion system further includes a plurality of propulsion and/or maneuvering nozzles, arranged as two clusters 5 and 6 of respectively five nozzles each, as well as two individual nozzles 7 and 8, respectively arranged on the housing 4. As can be seen in FIGS. 1, 2 and 3, the several nozzles 5, 6, 7 and 8 are oriented in different directions to provide multi-axis maneuvering control of the free-flying grasper unit 1. Each one of the twelve total nozzles can produce a thrust of 1 N in the present example embodiment. These nozzles are activated and controlled via the orbital platform 3 (e.g. by control commands conducted along the electrical signal conductors of the cable 2). These control commands can ultimately originate from a control station on the ground on earth, or in a space station, or the like. Thereby, the free-flying grasper unit 1 can be "flown", and maneuvered freely and independently of the orbital platform 3 within the range permitted by the maximum extension of the cable 2.

In order to provide location and operation feedback data back to the control station, the grasper unit 1 is further equipped with two stereo cameras 10 and 11, as well as a range or distance measuring sensor 37, for example preferably based on laser distance measurement technology. By providing the sensed distance measurement data as well as video or picture data (e.g. visible light, infrared, or any other suitable wavelength range) via the electrical signal conductors of the cable 2 back to the orbital platform 3, and from there to the control station, the human operator of the control station can easily and precisely remotely-control the maneuvering of the free-flying grasper unit 1 to a particular grasping point on a target object 12 that is to be grasped (see FIGS. 7 and 8). Once the grasper unit is at that location, the operator will also be able to remotely control the grasping mechanism as described next.

The free-flying grasper unit 1 further comprises a grasper-arm mechanism 14 mounted on an upper platform 13 of the housing or body 4 of the grasper unit 1. The grasper-arm mechanism 14 preferably comprises a three-fingered (i.e. three-jawed) controllable grasping claw 15 mounted by a flexible or journalled joint to a free distal end of an arm 16, which may be a fixed arm or preferably a telescoping arm 16 extending from the grasper unit body 4. The three-fingered grasping claw 15 is power actuated by any conventionally known actuator(s) and is adapted to open and close under remote-control in order to selectively grasp the target object 12 at a prescribed grasping point, and then to securely hold the target object 12. Furthermore, the telescoping arm 16 incorporates one or more actuators that can be remote-controlled so that the telescoping arm 16 is selectively extended from or retracted into the housing or body 4 of the grasper unit 1.

In the present example embodiment, the telescoping extension range of the telescoping arm 16 is about 60 cm, and the free-flying grasper unit 1 has a generally cylindrical configuration with outer dimensions of approximately 780 mm in length and approximately 480 mm in diameter.

As mentioned, four launch and separation mounting adapters 17, 18, 19 and 20 are provided on the bottom side of the grasper unit 1 opposite the grasper-arm mechanism 14. These mounting adapters 17 to 20 serve to selectively and releasably (and preferably repeatedly) secure the grasper unit 1 to the upper end of the orbital platform 3. These mounting adapters 17 to 20 securely hold the grasper unit 1 on the orbital platform 3 during a rocket launch phase, and are equipped with pyrotechnic units for pyrotechnically releasing the grasper unit 1, as well as release springs for ejecting the grasper unit 1 from the orbital platform 3 for carrying out a first mission. Additionally or alternatively, the mounting adapters 17 to 20 include controllable mounting clamps or grasping jaws that can be selectively repeatedly released or secured to selectively repeatedly release or secure the grasper unit 1 relative to the orbital platform 3. Alternatively, the mounting adapters 17 to 20 are intended only for securely mounting the grasper unit 1 to the orbital platform 3 during the rocket launch thereof, and then during in-space missions, the grasper unit 1 is held to the orbital platform 3 only by the tension cable 2 via the winch 35, whereby the mounting cone 36 is tightly drawn and held into the mating conical recessed receptacle.

FIG. 6 represents a perspective view of an embodiment of the inventive apparatus, including three free-flying grasper units 1, 21, 22 provided on an orbital platform 3 in the form of a utility or service satellite. Two of the grasper units are intended for use during service missions, i.e. for grasping a target object 12 such as a satellite during a mission, while the third grasper unit is provided as a reserve, for redundancy in the event of a failure of one of the other grasper units.

As described above, each one of the grasper units 1, 21 and 22 is equipped with its own independent cold gas propulsion system. In the present example embodiment, each grasper unit can be propelled with a total speed increment of about 75 m/sec. The nozzles 5 to 8 of each grasper unit 1, 21 or 22, which each produce a thrust of 1 N as described above, can thereby accelerate the respective grasper unit in such a manner so that it quickly reaches the speed and motion matching the movement of the target object 12. Thereby, the grasper-arm mechanism 14 can be maneuvered quickly, precisely and gently to the intended grasping point on the target object 12, and then activated to gently yet securely grasp the target object 12.

During a mission, and particularly during the free controlled and propelled flight of the grasper unit 1, 21 or 22 from the orbital platform 3, the cable winch or drum 35 is allowed to freely pay-out the cable 2, matched to the thrust of the nozzles 5 to 8 of the grasper unit. After the target object 12 has been grasped by the grasper-arm mechanism 14 of the respective grasper unit 1, 21 or 22, the cable winch 35 is controlled to regulate the extended length of the cable 2 so that the spacing distance between the orbital platform 3 and the target object 12 is held constant. The thruster nozzles 5 to 8 can be activated as necessary to prevent the grasper unit 1, 21, or 22 and object 12 from drifting closer to the orbital platform 3.

Then, after completion of the mission (e.g. towing the target object 12 to a different location), the grasper unit 1 releases the target object 12, and the cable winch 35 is operated to retract the cable 2 and thereby pull the grasper unit 1, 21 or 22 back to the orbital platform 3. Once the grasper unit 1, 21 or 22 reaches the orbital platform 3, the mounting cone 36 docks into the mating conical receptacle of the orbital platform 3, and the respective mounting adapters 17 to 20 securely seated on (or in) allocated seating locations (or recesses) on the platform 3 under the tension of the cable 2, and may optionally be re-engaged to securely and stably hold the grasper units on the orbital platform 3. At this point, the orbital platform 3 may be maneuvered to the next target object to be grasped.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for grasping a target object in space, comprising:
   an orbital platform;
   at least one free-flying grasper unit including a grasper unit body, a propulsion system with at least one propulsion nozzle mounted on said grasper unit body, and a grasper-arm mechanism arranged on said grasper unit body, wherein said grasper-arm mechanism is adapted to controlledly grasp the target object; and
   a respective cable that respectively connects said free-flying grasper unit to said orbital platform;
   wherein said cable includes a mechanical tension-transmitting cable element that extends between said orbital platform and said grasper unit, and insulated electrical conductor lines that extend between said orbital platform and said grasper unit and that are adapted to transmit electrical power and communication signals between said orbital platform and said grasper unit.

2. The apparatus according to claim 1, wherein said grasper-arm mechanism comprises an arm connected to and extending from said grasper unit body and a three-fingered grasping claw connected to a free distal end of said arm.

3. The apparatus according to claim 2, further comprising an articulated joint connecting said grasping claw to said free distal end of said arm.

4. The apparatus according to claim 2, wherein said arm is a telescoping arm that is selectively variably extendable from said grasper unit body.

5. The apparatus according to claim 2, wherein said arm is a fixed rigid arm that is fixedly connected to and immobile relative to said grasper unit body.

6. The apparatus according to claim 1, wherein said grasper unit further comprises a camera.

7. The apparatus according to claim 1, wherein said grasper unit further comprises a distance measuring sensor.

8. The apparatus according to claim 1, wherein said cable is selectively variably extendable to provide a selectable variable length of said cable between said orbital platform and said grasper unit.

9. The apparatus according to claim 8, wherein said orbital platform includes a controllably operable cable winch mounted on or in a platform body of said orbital platform, and wherein said cable is selectively wound-up on and unwound from said winch to provide said selectable variable length.

10. The apparatus according to claim 1, wherein said grasper unit remains permanently and continuously connected to said orbital platform by said cable.

11. The apparatus according to claim 1, wherein said orbital platform includes an independent propulsion system, and said propulsion system of said grasper unit enables said grasper unit to maneuver independently of said orbital platform within a range permitted by a length of said cable.

12. The apparatus according to claim 1, wherein said propulsion system comprises a cold gas propellant storage tank and plural thruster nozzles in a multi-axis maneuvering arrangement.

13. The apparatus according to claim 1, wherein said grasper unit further includes a docking and mounting cone protruding from said grasper unit body, and said orbital platform includes a recessed conical docking and mounting receptacle adapted to releasably receive said docking and mounting cone therein.

14. The apparatus according to claim 1, wherein said grasper unit further includes plural releasable mounting devices that are connected to said grasper unit body and that are adapted to releasably secure said grasper unit to said orbital platform.

15. The apparatus according to claim 1, comprising three of said free-flying grasper units respectively connected by three of said cables to said orbital platform.

16. An apparatus for grasping a target object in space, comprising:
   an orbital platform including a platform body, a controllably operable winch mounted in or on said platform body, and a first propulsion system including first propulsion nozzles mounted on said platform body;
   a free-flying grasper unit including a grasper unit body, a second propulsion system including second propulsion nozzles mounted on said grasper unit body, a camera, a distance measuring sensor, and a grasper-arm mechanism including an arm that is connected to and extends from said grasper unit body and a three-jawed grasping claw that is connected to a free distal end of said arm and is adapted to controlledly grasp the target object; and
   a cable that is connected to said grasper unit, and that is connected to and selectively wound-up on and unwound front said cable winch of said orbital platform, and that includes a mechanical tension-transmitting cable element and insulated electrical conductor lines that extend between said orbital platform and said grasper unit and are adapted to transmit electrical power and communication signals between said orbital platform and at least one of said grasper-arm mechanism, said second propulsion system, said camera and said distance measuring sensor of said grasper unit.

17. A free-flying grasper unit for grasping a target object in space, comprising:
   a grasper unit body,
   a propulsion system including propulsion nozzles arranged in multi-axis clusters mounted on said grasper unit body,
   a stereo camera arrangement mounted on said grasper unit body,
   a laser distance measuring sensor mounted on said grasper unit body,
   a grasper-arm mechanism including a telescoping arm that is connected to and selectively variably extends from said grasper unit body and a three-jawed grasping claw that is connected to a free distal end of said arm and is adapted to controlledly grasp the target object,
   a cable mounting point including a mechanical connection point and an electrical connection point respectively adapted to have a mechanical cable and an electrical cable connected thereto, whereby said grasper unit is adapted to be mechanically and electrically connected to an orbital platform via the cables and to receive control signals from the orbital platform via the electrical cable and said electrical connection point to control at least one of said propulsion system or said grasper-arm mechanism, and
   a plurality of mounting elements that extend from said grasper unit body opposite said grasper-arm mechanism and that are adapted to position and releasably mount Bald grasper unit relative to the orbital platform.

18. The apparatus according to claim 11, wherein said electrical conductor lines are connected to said propulsion system, of said grasper unit and wherein said orbital platform further includes a remote control system connected to said electrical conductor lines and adapted to provide control signals as said communication signals from said orbital platform to said grasper unit for control of said propulsion system of said grasper unit.

* * * * *

UNITED STATES PATENT AND TRADEMARK OFFICE
CERTIFICATE OF CORRECTION

PATENT NO. : 7,207,525 B2
APPLICATION NO. : 10/943788
DATED : April 24, 2007
INVENTOR(S) : Bischof et al.

Page 1 of 1

It is certified that error appears in the above-identified patent and that said Letters Patent is hereby corrected as shown below:

Column 4,
Line 29, after "flown", delete --,--;

Column 7,
Line 38, after "unwound", replace "front" by --from--;

Column 8,
Line 33, after "mount", replace "Bald" by --said--;
Line 36, after "system", delete --,--;
   after "unit", insert --,--.

Signed and Sealed this

Fourth Day of March, 2008

JON W. DUDAS
*Director of the United States Patent and Trademark Office*